(12) United States Patent
Mitra et al.

(10) Patent No.: US 9,098,323 B2
(45) Date of Patent: Aug. 4, 2015

(54) SIMULTANEOUS UTILIZATION OF A FIRST GRAPHICS PROCESSING UNIT (GPU) AND A SECOND GPU OF A COMPUTING PLATFORM THROUGH A VIRTUAL MACHINE (VM) IN A SHARED MODE AND A DEDICATED MODE RESPECTIVELY

(71) Applicant: NVIDIA Corporation, Santa Clara, CA (US)

(72) Inventors: Surath Mitra, Kolkata (IN); Kiran Pawar, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 142 days.

(21) Appl. No.: 14/018,420

(22) Filed: Sep. 5, 2013

(65) Prior Publication Data

US 2015/0067672 A1    Mar. 5, 2015

(51) Int. Cl.
  *G06F 9/455*    (2006.01)
  *G06F 9/50*     (2006.01)

(52) U.S. Cl.
  CPC ........ *G06F 9/45533* (2013.01); *G06F 9/45537* (2013.01); *G06F 9/45558* (2013.01); *G06F 9/5077* (2013.01)

(58) Field of Classification Search
  CPC ............ G06F 9/45533; G06F 9/45537; G06F 9/5077; G06F 9/45558; G06F 9/45545
  See application file for complete search history.

(56) References Cited

U.S. PATENT DOCUMENTS

| | | | |
|---|---|---|---|
| 8,200,796 B1 * | 6/2012 | Margulis ...................... 709/223 |
| 8,239,620 B2 * | 8/2012 | Hakewill ...................... 711/106 |
| 8,274,518 B2 * | 9/2012 | Blythe .......................... 345/522 |
| 8,405,666 B2 * | 3/2013 | Masood ........................ 345/530 |
| 8,418,179 B2   | 4/2013 | Papakipos et al. |
| 8,443,348 B2   | 5/2013 | McGuire et al. |
| 8,627,456 B2 * | 1/2014 | McKenzie et al. ............... 726/19 |
| 8,629,878 B2 * | 1/2014 | Jackson ........................ 345/522 |
| 8,635,612 B2 * | 1/2014 | Oney et al. ........................ 718/1 |
| 8,789,042 B2 * | 7/2014 | Hakewill .......................... 718/1 |
| 8,938,723 B1 * | 1/2015 | Tormasov et al. ............. 717/136 |
| 8,941,670 B2 * | 1/2015 | Malakapalli et al. ......... 345/503 |
| 8,970,603 B2 * | 3/2015 | Post et al. ..................... 345/501 |

(Continued)

OTHER PUBLICATIONS

Lauro et al. "Virtualizing general purpose GPUs for high performance cloud computing: an application to a fluid simulator", 2012 IEEE, pp. 863-864.*

(Continued)

*Primary Examiner* — Van Nguyen
(74) *Attorney, Agent, or Firm* — Zilka-Kotab, PC

(57) ABSTRACT

A method includes executing a driver component on a hypervisor of a computing platform including a first graphics processing unit (GPU) and a second GPU, and executing an instance of the driver component in the VM. The method also includes providing support for hardware virtualization of the second GPU in the hypervisor and the instance of the driver component executing in the VM, defining a data path between the VM and the first GPU in a configuration register, and defining a data path between the VM and the second GPU in another configuration register. Further, the method includes providing a capability to the VM to utilize the first GPU in a shared mode with one or more other VM(s) and to simultaneously dedicatedly utilize the second GPU based on reading exposed emulated versions of the configuration register and the another configuration register and the support for the hardware virtualization.

20 Claims, 4 Drawing Sheets

(56) References Cited

U.S. PATENT DOCUMENTS

| | | |
|---|---|---|
| 2011/0050712 A1 | 3/2011 | Jackson |
| 2011/0102443 A1 | 5/2011 | Dror et al. |
| 2012/0054740 A1* | 3/2012 | Chakraborty et al. ............ 718/1 |
| 2012/0272235 A1 | 10/2012 | Fahrig |

OTHER PUBLICATIONS

Nanjundappa et al. "SCGPSim: A Fast SystemC Simulator on GPUs", 2010 IEEE, pp. 149-154.*

Sinha et al. "Parallel Simulation of Mixed-abstraction SystemC Models on GPUs and Multicore CPUs", 2012 IEEE, pp. 455-460.*

* cited by examiner

SIMULTANEOUS UTILIZATION OF A FIRST GRAPHICS PROCESSING UNIT (GPU) AND A SECOND GPU OF A COMPUTING PLATFORM THROUGH A VIRTUAL MACHINE (VM) IN A SHARED MODE AND A DEDICATED MODE RESPECTIVELY

FIELD OF TECHNOLOGY

This disclosure relates generally to virtualized computing platforms and, more particularly, to simultaneous utilization of a first Graphics Processing Unit (GPU) and a second GPU of a computing platform through a virtual machine (VM) in a shared mode and a dedicated mode respectively.

BACKGROUND

A hypervisor may consolidate VMs on a computing platform including a GPU to enable sharing of resources thereof between the VMs. Sharing of the GPU resources may be detrimental to performance. Therefore, another GPU of the computing platform may dedicatedly be utilized by the VM to address requirements of a compute intensive application executing therein. When graphics capability is required in the VM, software emulation or another dedicated GPU may be employed therefore. Such a graphics capability provision may suffer from low performance and lack of support for key Application Programming Interface(s) (API(s)) such as Open Graphics Library (OpenGL) in the case of software emulation and restricted VM scalability in the case of utilization of the another dedicated GPU.

SUMMARY

Disclosed are a method, a device and/or a system of simultaneous utilization of a first Graphics Processing Unit (GPU) and a second GPU of a computing platform through a virtual machine (VM) in a shared mode and a dedicated mode respectively.

In one aspect, a method includes executing a driver component on a hypervisor of a computing platform including a first graphics processing unit (GPU) and a second GPU. The hypervisor is configured to consolidate a VM on the computing platform including the first GPU and the second GPU and to virtualize resources thereof. The method also includes executing an instance of the driver component in the VM, providing support for hardware virtualization of the second GPU in the hypervisor and the instance of the driver component executing in the VM, and defining a data path between the VM and the first GPU in a configuration register.

Further, the method includes defining a data path between the VM and the second GPU in another configuration register, and reading, through the instance of the driver component in the VM, an emulated version of the configuration register exposed through a hypervisor component executing on the hypervisor corresponding to the VM and an emulated version of the another configuration register exposed through the hypervisor. Still further, the method includes providing a capability to the VM to utilize the first GPU in a shared mode with one or more other VM(s) based on the data path definition read through the exposed emulated version of the configuration register, and to simultaneously dedicatedly utilize the second GPU based on the data path definition read through the exposed emulated version of the another configuration register and the support for the hardware virtualization of the second GPU in the instance of the driver component executing in the VM.

In another aspect, a non-transitory medium, readable through a computing platform and including instructions embodied therein that are executable through the computing platform, is disclosed. The non-transitory medium includes instructions to execute a driver component on a hypervisor of the computing platform including a first GPU and a second GPU. The hypervisor is configured to consolidate a VM on the computing platform including the first GPU and the second GPU and to virtualize resources thereof. The non-transitory medium also includes instructions to execute an instance of the driver component in the VM, instructions to provide support for hardware virtualization of the second GPU in the hypervisor and the instance of the driver component executing in the VM, and instructions to define a data path between the VM and the first GPU in a configuration register.

Further, the non-transitory medium includes instructions to define a data path between the VM and the second GPU in another configuration register, and instructions to read, through the instance of the driver component in the VM, an emulated version of the configuration register exposed through a hypervisor component executing on the hypervisor corresponding to the VM and an emulated version of the another configuration register exposed through the hypervisor. Still further, the non-transitory medium includes instructions to provide a capability to the VM to utilize the first GPU in a shared mode with one or more other VM(s) based on the data path definition read through the exposed emulated version of the configuration register, and to simultaneously dedicatedly utilize the second GPU based on the data path definition read through the exposed emulated version of the another configuration register and the support for the hardware virtualization of the second GPU in the instance of the driver component executing in the VM.

In yet another aspect, a computing platform includes a memory, a first GPU and a second GPU communicatively coupled to the memory. The computing platform also includes a hypervisor configured to consolidate a VM on the computing platform and to virtualize resources thereof. The hypervisor includes a driver component executing thereon. The VM executes an instance of the driver component thereon. Support for hardware virtualization of the second GPU is provided in the hypervisor and the instance of the driver component executing in the VM. A data path between the VM and the first GPU is configured to be defined in a configuration register, and a data path between the VM and the second GPU is configured to be defined in another configuration register.

The instance of the driver component in the VM is configured to read an emulated version of the configuration register exposed through a hypervisor component executing on the hypervisor corresponding to the VM and an emulated version of the another configuration register exposed through the hypervisor. The VM is provided with a capability to utilize the first GPU in a shared mode with one or more other VM(s) based on the data path definition read through the exposed emulated version of the configuration register, and to simultaneously dedicatedly utilize the second GPU based on the data path definition read through the exposed emulated version of the another configuration register and the support for the hardware virtualization of the second GPU in the instance of the driver component executing in the VM.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of simultaneous utilization of a first Graphics Processing Unit (GPU) and a second GPU of a computing platform through a virtual machine (VM) in a shared mode and a dedicated mode respectively. Although the present embodiments have been described with reference to specific example embodiments, it will be evident that various modifications and changes may be made to these embodiments without departing from the broader spirit and scope of the various embodiments.

Figure 1:
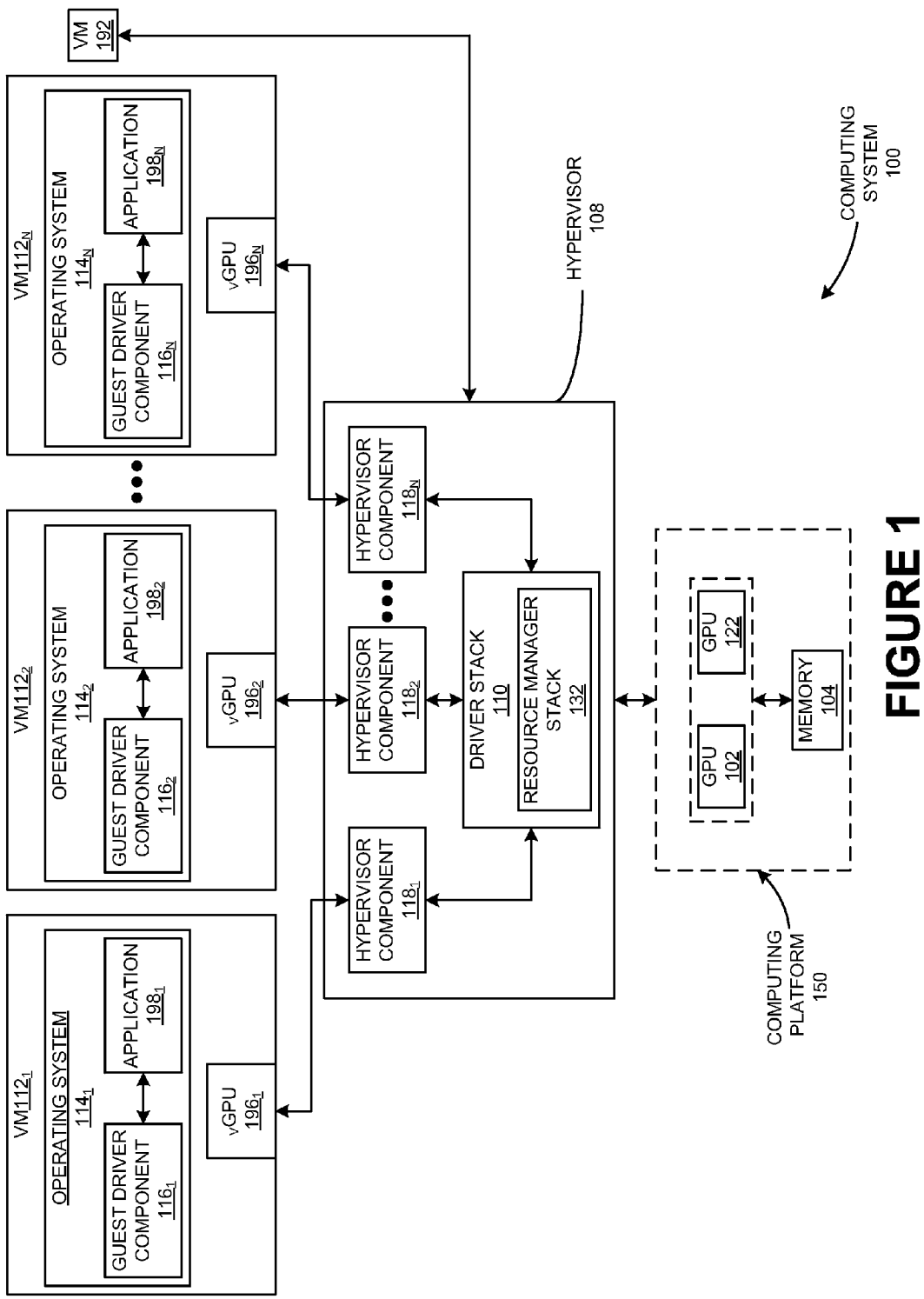
FIG. 1 is a schematic view of a hypervisor-based computing system including two Graphics Processing Unit(s) (GPU(s)) communicatively coupled to a memory.

FIG. 1 shows a computing system 100 including two Graphics Processing Units (GPUs), viz. GPU 102 and GPU 122 communicatively coupled to a memory 104 (e.g., volatile memory and/or non-volatile memory). It should be noted that two GPUs have been shown merely for the sake of illustrative convenience. An implementation involving more than two GPUs is within the scope of the exemplary embodiments discussed herein. Memory 104 may include storage locations configured to be addressable through GPU 102 and GPU 122. In one or more implementations, memory 104 may be shared between GPU 102 and GPU 122; alternately, memory 104 may include separate memories associated with GPU 102 and GPU 122.

GPU 102, GPU 122 and memory 104 may be part of a computing platform 150 associated with computing system 100. It is obvious that computing system 100 may also include a Central Processing Unit (CPU) (not shown). A hypervisor 108 may execute on computing platform 150; hypervisor 108 may be a high-level system software or a program enabling multiple operating systems share hardware resources of computing platform 150. Hypervisor 108 may control GPU 102, GPU 122, memory 104 and other resources of computing platform 150 to abstract each of the multiple operating systems; hypervisor 108 may consolidate virtual machines (VMs) on computing platform 150.

FIG. 1 shows a driver stack 110 executing on hypervisor 108 and a number of VMs $112_{1-N}$ consolidated on computing platform 150 through hypervisor 108. Each VM $112_{1-N}$ may execute a corresponding operating system $114_{1-N}$ therethrough. Each VM $112_{1-N}$ may also execute a guest driver component $116_{1-N}$ and may have a corresponding hypervisor component $118_{1-N}$ executing on hypervisor 108; hypervisor component $118_{1-N}$ may virtualize resources of GPU 102 and interact with the device emulation mechanism thereof (for example, hypervisor 108 may include a device emulation module therefore; components of a hypervisor and functionalities thereof are well-known to one of ordinary skill in the art; therefore, detailed discussion associated therewith has been skipped for the sake of brevity and convenience). Driver stack 110 may enable setting up of resources of GPU 102 (e.g., per VM channel) for guest driver component $116_{1-N}$; once a guest driver component $116_{1-N}$ has requisite resources of GPU 102 allocated thereto, guest driver component $116_{1-N}$ may directly communicate with GPU 102, without intervention of driver stack 110.

Driver stack 110 may include a resource manager stack 132 to manage assignment of resources of computing platform 150 to VMs $112_{1-N}$. Resource manager stack 132 may enable hypervisor 108 provide a virtualized GPU instance (vGPU) $196_{1-N}$ to each VM $112_{1-N}$. As shown in FIG. 1, each VM $112_{1-N}$ may execute an application $198_{1-N}$ thereon; application $198_{1-N}$ is shown as being part of operating system $114_{1-N}$. It is obvious that more than one application $198_{1-N}$ may execute on a VM $112_{1-N}$; FIG. 1 shows one application $198_{1-N}$ per VM $112_{1-N}$ merely for the sake of illustrative convenience.

In the case of GPU 122, hypervisor 108 may employ a hardware virtualization technology (e.g., utilizing Intel® Virtualization Technology for Directed Input/Output (I/O) (VT-d), utilizing an Input/Output Memory Management Unit (IOMMU)) to pass through GPU 122 to a VM 192. Thus, GPU 122 may be configured to dedicatedly (or, solely) serve VM 192. While sharing GPU 102 between multiple VMs $112_{1-N}$ provides for scalability, utilizing a dedicated GPU 122 to serve a VM 192 may provide for increased performance. For example, it may be preferable to utilize GPU 122 to dedicatedly serve VM 192 when executing an intensive NVIDIA® Compute Unified Device Architecture (CUDA™) application (e.g., a fluid mechanics simulation, image noise reduction).

When graphics capability is required in VM 192, software emulation may be employed therefore. Said software emulation may provide for low performance and lack of support for key Application Programming Interface(s) (API(s)) such as Open Graphics Library (OpenGL). To dispense with the low performance, VM 192 may utilize another GPU (not shown) dedicatedly for the graphics capability. However, this may limit the number of VMs executable on computing platform 150.

Figure 2:
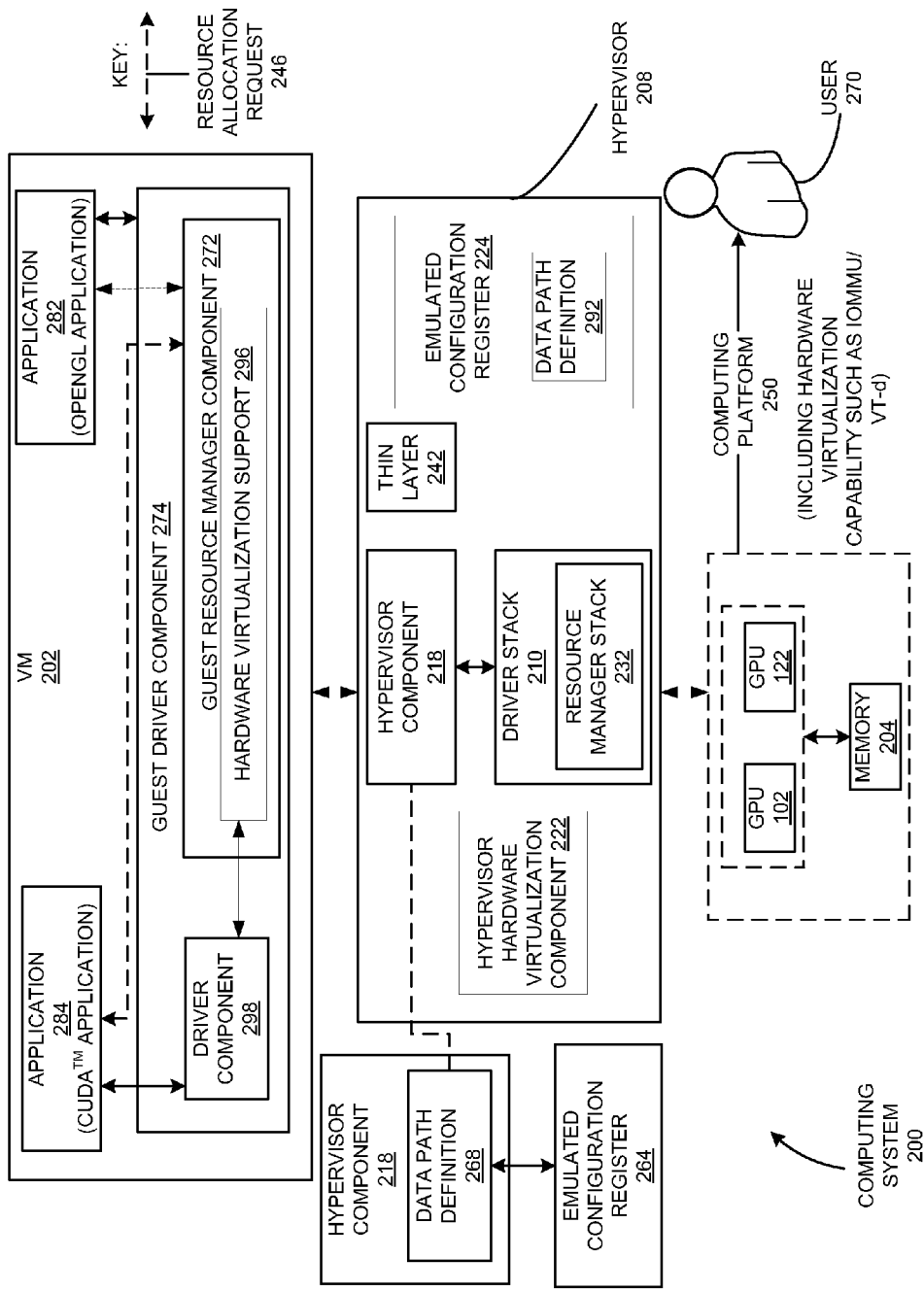
FIG. 2 is a schematic view of a hypervisor-based computing system configured to enable a virtual machine (VM) share two GPUs simultaneously, according to one or more embodiments.

FIG. 2 shows a computing system 200 configured to enable a VM 202 share GPU 122 and GPU 102 simultaneously, according to one or more embodiments. In one or more embodiments, VM 202 may, again, be consolidated on a computing platform 250 associated with computing system 200 through a hypervisor 208 analogous to hypervisor 108. In one or more embodiments, memory 204, driver stack 210 and resource manager stack 232 may be analogous to memory 104, driver stack 110 and resource manager stack 132 respectively. In one or more embodiments, in accordance with the loading of VM 202, a guest resource manager component 272 may be executed on VM 202; guest resource manager component 272 may be part of a guest driver component 274, the other portions of which are loaded after guest resource manager component 272.

In one or more embodiments, guest driver component 274 may be an instance of a driver component that is part of driver stack 210 executing on hypervisor. For example, guest driver component 274 may include an OpenGL driver component configured to enable support of an OpenGL API to provide enhanced graphics rendering capability within VM 202.

It should be noted that an analogous guest resource manager component (not shown in FIG. 1) may also be a part of computing system 100. However, the aforementioned analogous guest resource manager component may solely be capable of enabling data processing either through a dedicated GPU or a GPU shared between VMs. In contrast, in one or more embodiments, guest resource manager component 272 may be modified to enable reading of configuration settings associated with both GPU 102 and GPU 122. In one or more embodiments, the aforementioned settings may be made available to guest resource manager component 272 by way of a hypervisor component 218 (e.g., through providing access to an emulated configuration register 264; it is obvious that emulated configuration register 264 may include more than one emulated configuration register(s)) executing on hypervisor 208 in the case of GPU 102 and by way of hypervisor 208 itself in the case of GPU 122. In one or more embodiments, hypervisor 208 may include support for hardware virtualization (e.g., for IOMMU) of GPU 122 by way of a hypervisor hardware virtualization component 222 provided therein.

Further, in one or more embodiments, support for hardware virtualization (e.g., for IOMMU) may also be provided in guest resource manager component 272 in the case of GPU 122. It is obvious that hypervisor component 218 may be analogous to hypervisor component $118_{1-N}$ of FIG. 1. It should be noted that VMs sharing utilization of GPU 102 other than VM 202 have been ignored for the sake of illustrative convenience and clarity.

In one or more embodiments, computing system 200 may enable specifying functionalities from a side of computing platform 250. In one or more embodiments, a user 270 (e.g., an administrator) of computing platform 250 may decide on GPU resources being allocated to applications (e.g., application 282 and application 284 shown in FIG. 2) executing on VM 202; in other words, user 270 may decide on the application (e.g., application 284) configured to dedicatedly utilize GPU 122 and the application (e.g., application 282; an example application 282 may be an OpenGL application) configured to utilize GPU 102 in a shared mode thereof with other VMs (not shown). For example, a data path between VM 202 and GPU 102 in the shared mode may be defined through hypervisor component 218. FIG. 2 shows a data path definition 268 between VM 202 and GPU 102 as part of hypervisor component 218; emulated configuration register 264 is shown interfaced with data path definition 268. In one or more embodiments, during loading of guest driver component 274, guest resource manager component 272 may read emulated configuration register 264 to track configuration settings (e.g., VMs including VM 202) associated with GPU 102.

In the case of GPU 122, a data path between VM 202 and GPU 122 may be defined and stored in memory 104. In one or more embodiments, hypervisor 208 may expose an emulated version of the data path definition (e.g., data path definition 292) to VM 202 in an emulated configuration register 224. As shown in FIG. 2, an example application 284 may be a compute intensive CUDA application. In one or more embodiments, driver stack 210 executing on hypervisor 208 may be packaged with a driver component (e.g., a CUDA™ driver component) associated with application 284. In one or more embodiments, as discussed above, hardware virtualization support 296 (e.g., by way of including an IOMMU driver component) may also be provided in guest resource manager component 272 to enable VM 202 be aware of the hardware virtualization of the dedicated GPU 122.

In one or more embodiments, as and when application 284 executes on VM 202, a driver component 298 (e.g., CUDA driver component) associated with application 284 may be loaded on VM 202 as part of guest driver component 274. In one or more embodiments, the execution of driver component 298, along with hardware virtualization support 296 provided in guest resource manager component 272, may dynamically tie down application 284 to GPU 122; in one or more embodiments, GPU 122 may be rendered controllable through VM 202 by way of a device assignment operation (e.g., implemented as a hypercall from VM 202 to hypervisor 208). Alternately (or, additionally), a mapping (e.g., defined through user 270) may exist between application 284 and GPU 122 in memory 204 by way of the data path definition discussed above; in an example embodiment, a configuration Application Programming Interface (API) may be exposed to user 270 (or, another user) during execution of application 284 that enables tying GPU 122 to application 284 based on hardware virtualization support 296.

In one or more embodiments, application 282 or application 284 may transmit a resource allocation request 246 to guest resource manager component 272. In one or more embodiments, based on the exposed emulated configuration register 264/data path definition 268 or the tying of GPU 122 to application 284, guest resource manager component 272 may be configured to determine whether resource allocation request 246 is directed to GPU 102 or GPU 122. It is obvious that resource allocation requests may be transmitted both from application 282 and application 284. Guest resource manager component 272 may be configured to determine the appropriate GPUs to which said resource allocation requests are directed to.

In one or more embodiments, if resource allocation request 246 is determined to be directed to GPU 122, guest resource manager component 272 may be configured to process said resource allocation request 246 internally to allow for dedicated execution of application 284 utilizing GPU 122. In one or more embodiments, if resource allocation request 246 is determined to be directed to GPU 102, guest resource manager component 272 may forward said resource allocation request 246 for processing through hypervisor 208; hypervisor component 218 may be configured to process resource allocation request 246 to allow for shared execution of application 282 through GPU 102 with one or more applications associated with one or more other VMs.

It should be noted that a thin layer of software (e.g., thin layer 242) may be implemented within hypervisor 208 to enable processing of resource allocation request 246 therethrough instead of guest resource manager component 272; here, guest resource manager component 272 may forward resource allocation request 246 to thin layer 242, which, in turn, may enable data processing through GPU 102 or GPU 122. Further, it should be noted that in an example embodiment, guest resource manager component 272 may determine whether resource allocation request 246 is directed to GPU 102 or GPU 122; thin layer 242 may merely enable the data processing through GPU 102 or GPU 122.

Figure 3:
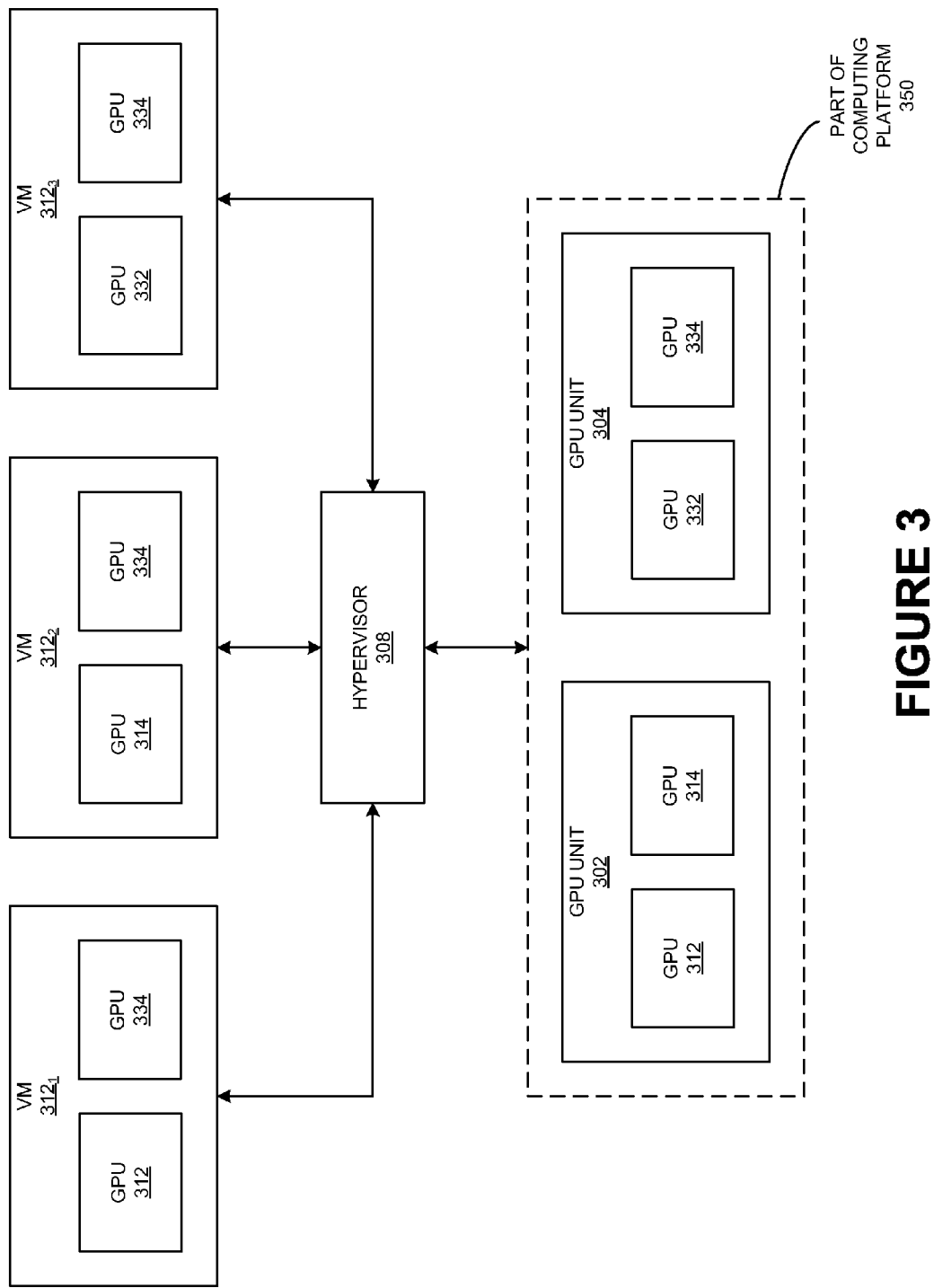
FIG. 3 is a schematic view of an example implementation of the computing system of FIG. 2.

FIG. 3 shows a use case of concepts associated with the exemplary embodiments discussed herein. Here, a computing platform 350 (analogous to computing platform 250 and computing platform 150) may include two GPU units, viz. GPU unit 302 and GPU unit 304. Each of GPU unit 302 and GPU unit 304 may include two GPUs, viz. GPU 312 and GPU 314 in the case of GPU unit 302 and GPU 332 and GPU 334 in the case of GPU unit 304. A hypervisor 308 may consolidate VMs $312_{1-3}$ on computing platform 350. The execution of guest resource manager component(s) on VMs $312_{1-3}$ may be analogous to the discussion with regard to FIG. 2. Here, VM $312_1$ may dedicatedly utilize GPU 312 and utilize GPU 334 in a shared mode with other VMs $312_{2-3}$; VM $312_2$ may dedicatedly utilize GPU 314 and utilize GPU 334 in a shared mode with other VMs $312_{1-3}$; VM $312_3$ may dedicatedly utilize GPU 332 and utilize GPU 334 in a shared mode with other VMs $312_{1-2}$. GPU 334 may be utilized to provide graphics processing capability and dedicated GPU 312, GPU 314 and GPU 332 may be utilized for high performance computing.

Thus, exemplary embodiments may provide for a means to simultaneously utilize GPU 102 and GPU 122 in VM 202. As discussed above, graphics capability within a VM in current GPU passthrough solutions may be provided through software emulation or through utilizing a dedicated GPU; said solutions provide for low performance and lack of support for key APIs such as OpenGL or low VM scalability. Exemplary embodiments may override the aforementioned issues through the simultaneous utilization of GPU 102 and GPU 122 in VM 202.

Figure 4:
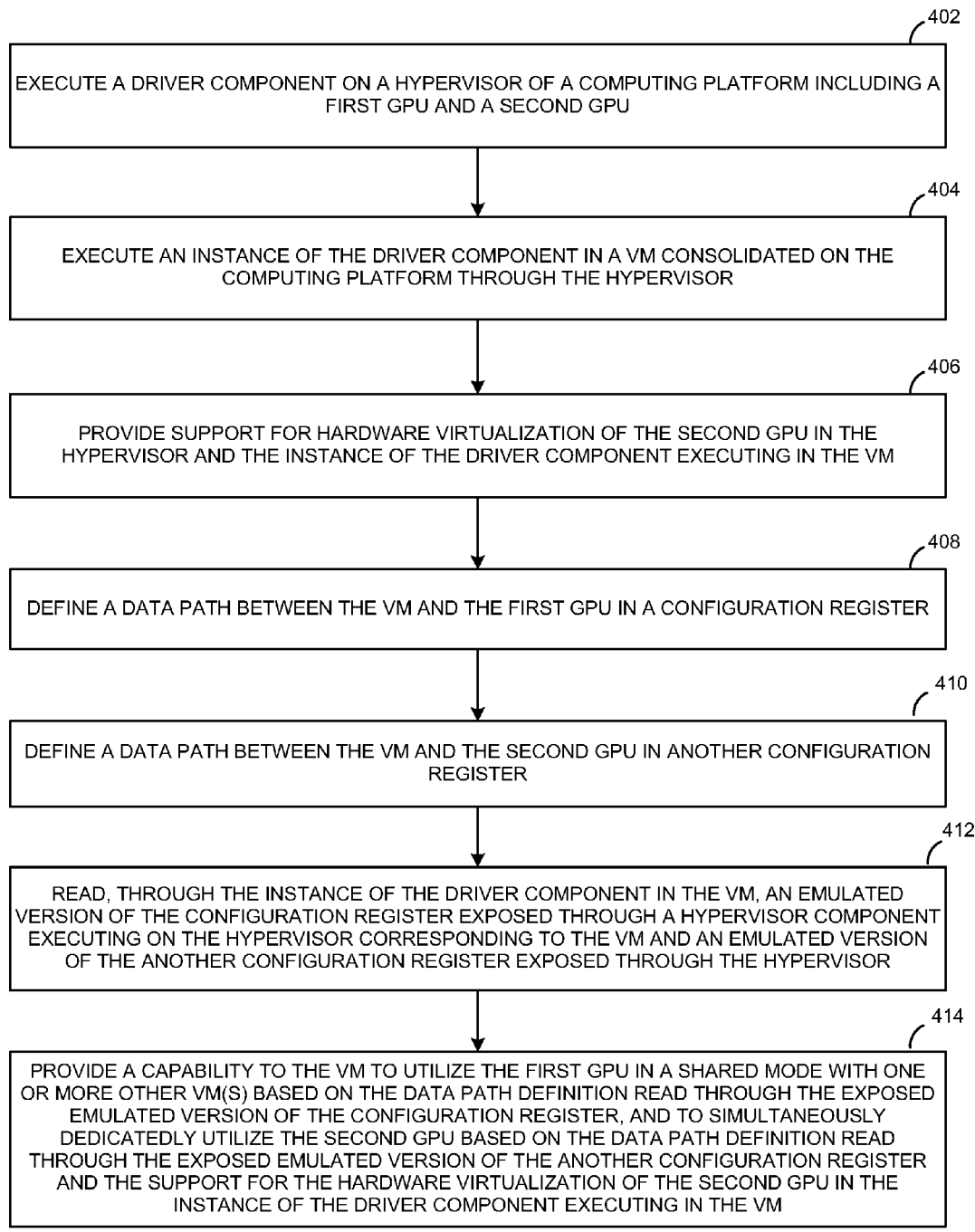
FIG. 4 is a process flow diagram detailing the operations involved in simultaneous utilization of a first GPU and a second GPU of a computing platform through a VM in a shared mode and a dedicated mode respectively, according to one or more embodiments.

FIG. 4 shows a process flow diagram detailing the operations involved in simultaneous utilization of a first GPU (e.g., GPU 102) and a second GPU (e.g., GPU 122) of computing platform 250 through VM 202 in a shared mode and a dedicated mode respectively, according to one or more embodiments. In one or more embodiments, operation 402 may involve executing a driver component (e.g., part of driver stack 210) on hypervisor 208 of computing platform 250 including GPU 102 and GPU 122. In one or more embodiments, hypervisor 208 may be configured to consolidate VM 202 on computing platform 250 including GPU 102 and GPU 122 and to virtualize resources thereof. In one or more embodiments, operation 404 may involve executing an instance of the driver component (e.g., guest driver component 274) in VM 202. In one or more embodiments, operation 406 may involve providing support for hardware virtualization of GPU 122 in hypervisor 208 and the instance of the driver component executing in VM 202.

In one or more embodiments, operation 408 may involve defining a data path between VM 202 and the GPU 102 in a configuration register. In one or more embodiments, operation 410 may involve defining a data path between VM 202 and GPU 122 in another configuration register. In one or more embodiments, operation 412 may involve reading, through the instance of the driver component in VM 202, an emulated version of the configuration register (e.g., emulated configuration register 264) exposed through hypervisor component 218 and an emulated version of the another configuration register (e.g., emulated configuration register 224) exposed through hypervisor 208. In one or more embodiments, operation 414 may then involve providing a capability to VM 202 to utilize GPU 102 in a shared mode with one or more other VM(s) based on the data path definition read through the exposed emulated version of the configuration register and to simultaneously dedicatedly utilize GPU 122 based on the data path definition read through the exposed emulated version of the another configuration register and the support for hardware virtualization of GPU 122 in the instance of the driver component executing in VM 202.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium (e.g., a Compact Disc (CD), a Digital Video Disc (DVD), a Blu-ray Disc®, a hard drive; appropriate instructions may be downloaded to the hard drive) and/or a machine-accessible medium compatible with a data processing system (e.g., computing system 200; computing platform 250), and may be performed in any order (e.g., including using means for achieving the various operations).

Accordingly, the specification and the drawings are to be regarded in an illustrative rather than a restrictive sense.

What is claimed is:

1. A method comprising:
executing a driver component on a hypervisor of a computing platform comprising a first graphics processing unit (GPU) and a second GPU, the hypervisor being configured to consolidate a virtual machine (VM) on the computing platform comprising the first GPU and the second GPU and to virtualize resources thereof;
executing an instance of the driver component in the VM;
providing support for hardware virtualization of the second GPU in the hypervisor and the instance of the driver component executing in the VM;
defining a data path between the VM and the first GPU in a configuration register;
defining a data path between the VM and the second GPU in another configuration register;
reading, through the instance of the driver component in the VM, an emulated version of the configuration register exposed through a hypervisor component executing on the hypervisor corresponding to the VM and an emulated version of the another configuration register exposed through the hypervisor; and
providing a capability to the VM to:
utilize the first GPU in a shared mode with at least one other VM based on the data path definition read through the exposed emulated version of the configuration register, and
simultaneously dedicatedly utilize the second GPU based on the data path definition read through the exposed emulated version of the another configuration register and the support for the hardware virtualization of the second GPU in the instance of the driver component executing in the VM.

2. The method of claim 1, further comprising:
executing a guest resource manager component as part of the instance of the driver component in the VM;
determining, through the guest resource manager component, whether a resource allocation request from an application is directed to the first GPU or the second GPU;
processing the resource allocation request through one of:
the guest resource manager component and a thin layer implemented in the hypervisor if the resource allocation request is determined to be directed to the second GPU; and forwarding the resource allocation request for processing through the hypervisor component executing on the hypervisor corresponding to the VM if the resource allocation request is determined to be directed to the first GPU.

3. The method of claim 1, comprising rendering the second GPU controllable through the VM through a device assignment operation implemented as a hypercall from the VM to the hypervisor.

4. The method of claim 1, comprising managing resource allocation associated with the computing platform to the VM and the at least one other VM in the shared mode through a resource manager stack executing on the hypervisor.

5. The method of claim 1, further comprising loading, as part of the instance of the driver component in the VM, a driver component associated with an application to be executed through the second GPU as and when the application executes in the VM.

6. The method of claim 1, further comprising providing a capability to the at least one other VM to dedicatedly utilize a third GPU of the computing platform simultaneously during utilization of the first GPU in the shared mode.

7. The method of claim 1, comprising executing a compute intensive application in the VM dedicatedly through the second GPU and executing an application providing graphics capability within the VM through the first GPU in the shared mode with the at least one other VM.

8. A non-transitory medium, readable through a computing platform and including instructions embodied therein that are executable through the computing platform, comprising:
instructions to execute a driver component on a hypervisor of the computing platform comprising a first graphics processing unit (GPU) and a second GPU, the hypervisor being configured to consolidate a virtual machine (VM) on the computing platform comprising the first GPU and the second GPU and to virtualize resources thereof;
instructions to execute an instance of the driver component in the VM;
instructions to provide support for hardware virtualization of the second GPU in the hypervisor and the instance of the driver component executing in the VM;
instructions to define a data path between the VM and the first GPU in a configuration register;
instructions to define a data path between the VM and the second GPU in another configuration register;
instructions to read, through the instance of the driver component in the VM, an emulated version of the configuration register exposed through a hypervisor component executing on the hypervisor corresponding to the VM and an emulated version of the another configuration register exposed through the hypervisor; and
instructions to provide a capability to the VM to:
utilize the first GPU in a shared mode with at least one other VM based on the data path definition read through the exposed emulated version of the configuration register, and
simultaneously dedicatedly utilize the second GPU based on the data path definition read through the exposed emulated version of the another configuration register and the support for the hardware virtualization of the second GPU in the instance of the driver component executing in the VM.

9. The non-transitory medium of claim 8, further comprising instructions to:
execute a guest resource manager component as part of the instance of the driver component in the VM;
determine, through the guest resource manager component, whether a resource allocation request from an application is directed to the first GPU or the second GPU;
process the resource allocation request through one of: the guest resource manager component and a thin layer implemented in the hypervisor if the resource allocation request is determined to be directed to the second GPU; and
forward the resource allocation request for processing through the hypervisor component executing on the hypervisor corresponding to the VM if the resource allocation request is determined to be directed to the first GPU.

10. The non-transitory medium of claim 8, comprising instructions to render the second GPU controllable through the VM through a device assignment operation implemented as a hypercall from the VM to the hypervisor.

11. The non-transitory medium of claim 8, comprising instructions to manage resource allocation associated with the computing platform to the VM and the at least one other VM in the shared mode through a resource manager stack executing on the hypervisor.

12. The non-transitory medium of claim 8, further comprising instructions to load, as part of the instance of the driver component in the VM, a driver component associated with an application to be executed through the second GPU as and when the application executes in the VM.

13. The non-transitory medium of claim 8, further comprising instructions to provide a capability to the at least one other VM to dedicatedly utilize a third GPU of the computing platform simultaneously during utilization of the first GPU in the shared mode.

14. A computing platform comprising:
a memory;
a first graphics processing unit (GPU) and a second GPU communicatively coupled to the memory; and
a hypervisor configured to consolidate a virtual machine (VM) on the computing platform and to virtualize resources thereof, the hypervisor including a driver component executing thereon, and the VM executing an instance of the driver component thereon,
wherein support for hardware virtualization of the second GPU is provided in the hypervisor and the instance of the driver component executing in the VM,
wherein a data path between the VM and the first GPU is configured to be defined in a configuration register,
wherein a data path between the VM and the second GPU is configured to be defined in another configuration register,
wherein the instance of the driver component in the VM is configured to read an emulated version of the configuration register exposed through a hypervisor component executing on the hypervisor corresponding to the VM and an emulated version of the another configuration register exposed through the hypervisor, and
wherein the VM is provided with a capability to:
utilize the first GPU in a shared mode with at least one other VM based on the data path definition read through the exposed emulated version of the configuration register, and
simultaneously dedicatedly utilize the second GPU based on the data path definition read through the exposed emulated version of the another configuration register and the support for the hardware virtualization of the second GPU in the instance of the driver component executing in the VM.

15. The computing platform of claim 14, wherein:
the instance of the driver component in the VM executes a guest resource manager component as a part thereof,
the guest resource manager component is configured to determine whether a resource allocation request from an application is directed to the first GPU or the second GPU,
the resource allocation request is processed through one of: the guest resource manager component and a thin layer implemented in the hypervisor if the resource allocation request is determined to be directed to the second GPU, and
the resource allocation request is forwarded for processing through the hypervisor component executing on the hypervisor corresponding to the VM if the resource allocation request is determined to be directed to the first GPU.

16. The computing platform of claim 14, wherein the second GPU is rendered to be controllable through the VM through a device assignment operation implemented as a hypercall from the VM to the hypervisor.

17. The computing platform of claim 14, wherein the hypervisor is configured to execute a resource manager stack to manage resource allocation associated with the computing platform to the VM and the at least one other VM in the shared mode.

18. The computing platform of claim 14, wherein the instance of the driver component is configured to have a driver component associated with an application to be executed through the second GPU loaded as a part thereof as and when the application executes in the VM.

19. The computing platform of claim 14, further comprising a third GPU,
wherein the at least one other VM is provided with a capability to dedicatedly utilize the third GPU simultaneously during utilization of the first GPU in the shared mode.

20. The computing platform of claim 14, wherein the second GPU is configured to dedicatedly execute a compute intensive application in the VM and the first GPU is configured to execute an application providing graphics capability within the VM in the shared mode with the at least one other VM.

* * * * *